United States Patent [19]

Di Piazza et al.

[11] 4,104,503

[45] Aug. 1, 1978

[54] METHOD OF ELECTROEROSION AND AN APPARATUS FOR PRODUCING CAVITIES INSIDE A SOLID METAL COMPONENT

[75] Inventors: Learco Di Piazza, Ispra (Varese); Angelo Migoni, Castelletto Ticino, both of Italy

[73] Assignee: European Atomic Energy Community (Euratom), Kirchberg, Luxembourg

[21] Appl. No.: 727,631

[22] Filed: Sep. 29, 1976

[30] Foreign Application Priority Data

Oct. 2, 1975 [LU] Luxembourg .......................... 73498

[51] Int. Cl.$^2$ .......................... B23P 1/04; B23P 1/16; B23K 9/16
[52] U.S. Cl. .......................... 219/69 E; 204/224 M; 204/129.35; 204/129.55; 204/2.88; 219/69 M
[58] Field of Search .......... 204/129.1, 129.35, 129.55, 204/224 M, 288; 219/69 E, 69 M

[56] References Cited

U.S. PATENT DOCUMENTS

| 2,577,644 | 12/1951 | Bartlett | 204/224 R |
| 2,902,584 | 1/1959 | Ullmann | 204/224 MUX |
| 3,306,838 | 2/1967 | Johnson | 204/129.55 X |
| 3,719,569 | 3/1973 | Gosger | 204/129.55 |

FOREIGN PATENT DOCUMENTS 337,225  5/1972  U.S.S.R. .............. 204/224 M

*Primary Examiner*—John H. Mack
*Assistant Examiner*—D. R. Valentine
*Attorney, Agent, or Firm*—Stevens, Davis, Miller & Mosher

[57] ABSTRACT

An apparatus for electroerosion within a solid component which includes a hollow stationary cylinder, a control rod surrounded by and coaxial with the cylinder, a driving square terminating one end of the rod and an electrode connected to said driving square. The electrode is pivotable around an axis perpendicular to the axis of the cylinder, movable together with the rod along the axis of the cylinder, positionable perpendicular to the axis of the cylinder and rotatable around the axis. The method comprises machining a pilot channel in the solid component having a cross-sectional identical with the aperture cross-section of the proposed cavity, introducing an electrode into the channel, moving the electrode relative to the solid component and removing material from the cavity so formed in the solid component.

7 Claims, 11 Drawing Figures

METHOD OF ELECTROEROSION AND AN APPARATUS FOR PRODUCING CAVITIES INSIDE A SOLID METAL COMPONENT

This invention relates to a method of electroerosion and an apparatus for producing cavities inside a solid metal component.

In a known method of machining metal components by electroerosion, a given hollow profile is produced in the workpiece by the "male and female mould" principle. There is thus a one-to-one correspondence between the final component and the profiled electrode. This means, of course, that the electrode must be given a special shape in relief before each hollow is shaped. Usually, the electrode is moved towards and into the workpiece in a strictly rectilinear manner, but non-linear motion is also known, when it is necessary to produce a circular curved channel in a component (as in U.S. Pat. No. 3,306,838).

In addition to the "male and female mould" technique, electroerosion has been used for cutting components. In order, for example, to remove a pre-cut core from a component (cf. French Pat. No. 1,506,733), the electrode is inserted into the component through a pilot channel as far as the root of the pre-cut core. The core is then cut from the rest of the component by radial sawing, thus obtaining a cylinder. In these examples the cavities obtained by electroerosion proper never exceed the electrode in shape or size. Basically, they are simply channels which are profiled to some extent, or slots or grooves.

The present invention relates to a method of electroerosion and an associated electrode assembly wherein the electrode used for excavation by electroerosion has extreme liberty of action, so that the dimensions of the cavities obtained in solid components no longer depend on the electrode geometry.

In the method of the present invention an access recess is suitably machined in the component, leading to the region of the cavity to be excavated, the aperture cross-section of the recess being the same as the aperture cross-section of the proposed cavity, after which the electrode assembly is introduced into the recess, the electrode assembly comprises a movable, articulated pencil-shaped electrode narrower than the width of the recess and is mounted at the end of the electrode assembly and the pencil-shaped electrode is moved in controlled manner over the surface of the machined recess. In use the electrode moves forward as far as the most remote spatial coordinates of the cavity, which is to be formed progressively.

The present invention also provides an apparatus for electroerosion within a solid component, said apparatus comprising a hollow stationary cylinder which surrounds and is coaxial with a control rod extending therethrough and terminating in a driving square, and an electrode connected thereto, said electrode being pivotable around an axis perpendicular to the axis of the cylinder, and the assembly comprising the cylinder and the electrode being movable along the axis of the cylinder or perpendicular thereto and rotatable around said axis.

The electrode, therefore, is used in a manner somewhat similar to a dentist's drill.

The invention will now be described with reference to the accompanying drawings, in which the electrode assembly and various cavities which can be produced are shown by way of example. In the drawings:

FIG. 1 shows one embodiment of an apparatus according to the invention in the operating position, FIG. 2 shows the electrode control system in longitudinal section, and FIGS. 3 to 11 show different shapes of cavities obtained.

The arrows indicate the motion of the electrode. Reference a) denotes the shape to be produced in the solid component and reference b) denotes the motion of the electrode assembly.

FIG. 1 shows a device for electroerosion inside a solid component, comprising a hollow, stationary cylinder containing and coaxial with a control rod at the bottom of which is a driving square to which the electrode is articulated. The electrode is pivotable around an axis perpendicular to the axis of the cylinder. The assembly formed by the cylinder and the electrode can, depending on the required machining, move along the axis of the cylinder or perpendicular thereto or rotate therearound.

In the present case, the following movements are possible:

Vertical or horizontal motion in a straight line in both directions of the entire apparatus;

rotation of the electrode around an axis perpendicular to the axis of the stationary cylinder, and rotation of the workpiece and motion thereof in a straight line.

Instead of the workpiece rotating or moving in a straight line, the electrode assembly can be rotated in the opposite direction to obtain the same result. Incidentally, in the two latter cases, the direction of motion has no importance, since only the relative motion is important.

FIG. 1 shows an assembly 1 in the operating position for producing a spherical cavity 2 in a solid component 3 secured by a mandrel 4 to a base 5 which can rotate around its vertical axis. The axis in the present case, is represented by a stationary cylinder 6 of the assembly 1. In order to produce certain cavities, e.g. volumes of revolution such as a sphere, cylinder or cone, an electrode 9 and the component 3 have to rotate relative to one another. In the present case, it is preferable for the electrode to be stationary and for the component to rotate.

The stationary part of the assembly 1 comprises a cylindrical metal sheath 6 in which a control rod 8 for electrode 9 can slide. The sheath 6 is held vertically by a body 10 through which it extends and which is held horizontally by two columns 11 and bolts 12.

FIG. 2 is a detailed view of means 13 for controlling the motion of the movable electrode 9. A push rod 14 disposed in the body of the stationary part 6 and actuated by a cam (not shown) transmits motion via a lever 15 guided by a shaft 17 to a driving square 16 at which electrode 9 is centred or guided. The electrode 9 comprises a parallelepipedal graphite bar, either single (FIG. 2) or double (FIG. 1) in length, pivoting around the transverse axis 18 of an electrode holder disposed in the driving square and fixed to the extremity of 6. The electrode 9 operates along a radius (in the case of the single length) or simultaneously along two radii (in the case of the double length in FIG. 1).

FIGS. 3 to 11 show various applications of the electrode for obtaining various cavities of revolution or parallelepipedal or polyhedral cavities, etc. FIG. 3 illustrates the production of a sphere. Electrode 9 pivots around its centre 0° at 90°, whereas the solid component rotates around its vertical axis. During the operation, a dielectric liquid such as water or kerosene is injected through space 7 between the sheath 6 and the rod 8 so as to remove the metal particles released by erosion of the cavity 2. The liquid and the particles subsequently emerge through the front aperture 19.

As shown in all the drawings, the front aperture 19, when not necessarily required, simply has to be sufficiently wide to admit the electrode when in its most compact position.

Figure 6:
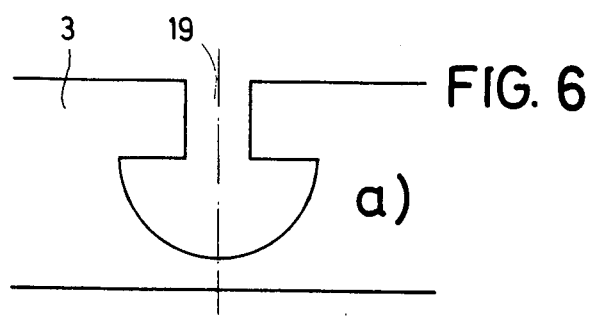
Figure 6:
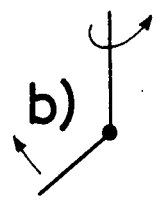

A hemisphere can be produced simply by using one arm of the electrode, as shown in FIG. 6.

Figure 7:
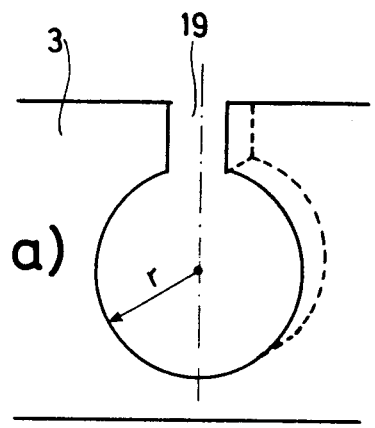

FIG. 7 shows the production of an axially horizontal cylinder; the electrode rotates around its horizontal axis when the workpiece is stationary, after which the cylindrical cavity is obtained by motion in a straight line.

Figure 8:
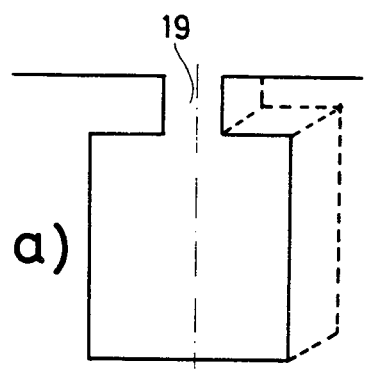

FIG. 8 illustrates the production of a rectangular parallelepipedal volume. Starting from the preceding cylinder, the electrode is placed perpendicular to the vertical axis and the assembly is moved longitudinally and vertically.

Figure 5:
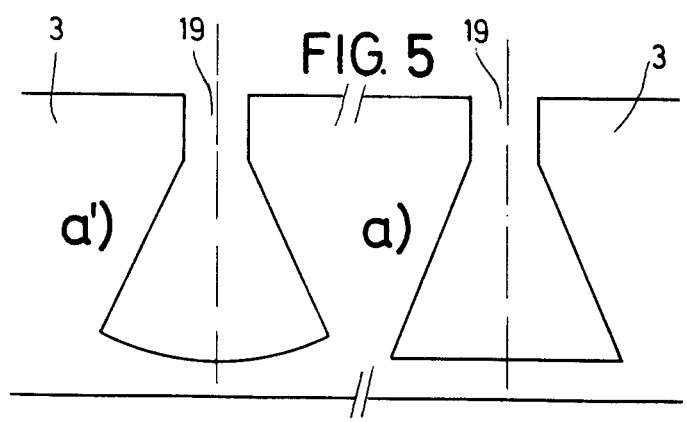
FIG. 5 shows how the rotation and lowering of the movable part can be combined in a predetermined advance so as to produce a conical cavity having a flat 5a or spherical 5a' bottom.
Figure 5:
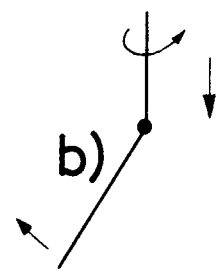
Figure 9:
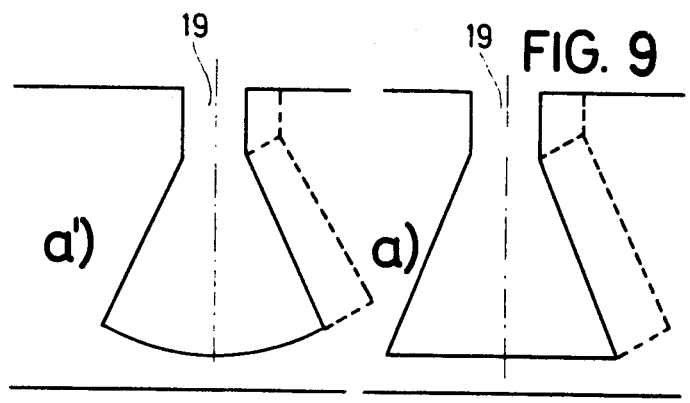

FIG. 9 shows the production of a trapezoidal volume having a flat bottom a) or a curved bottom a'). The procedure is the same as in FIG. 5, except that the workpiece is not rotated.

Figure 1:
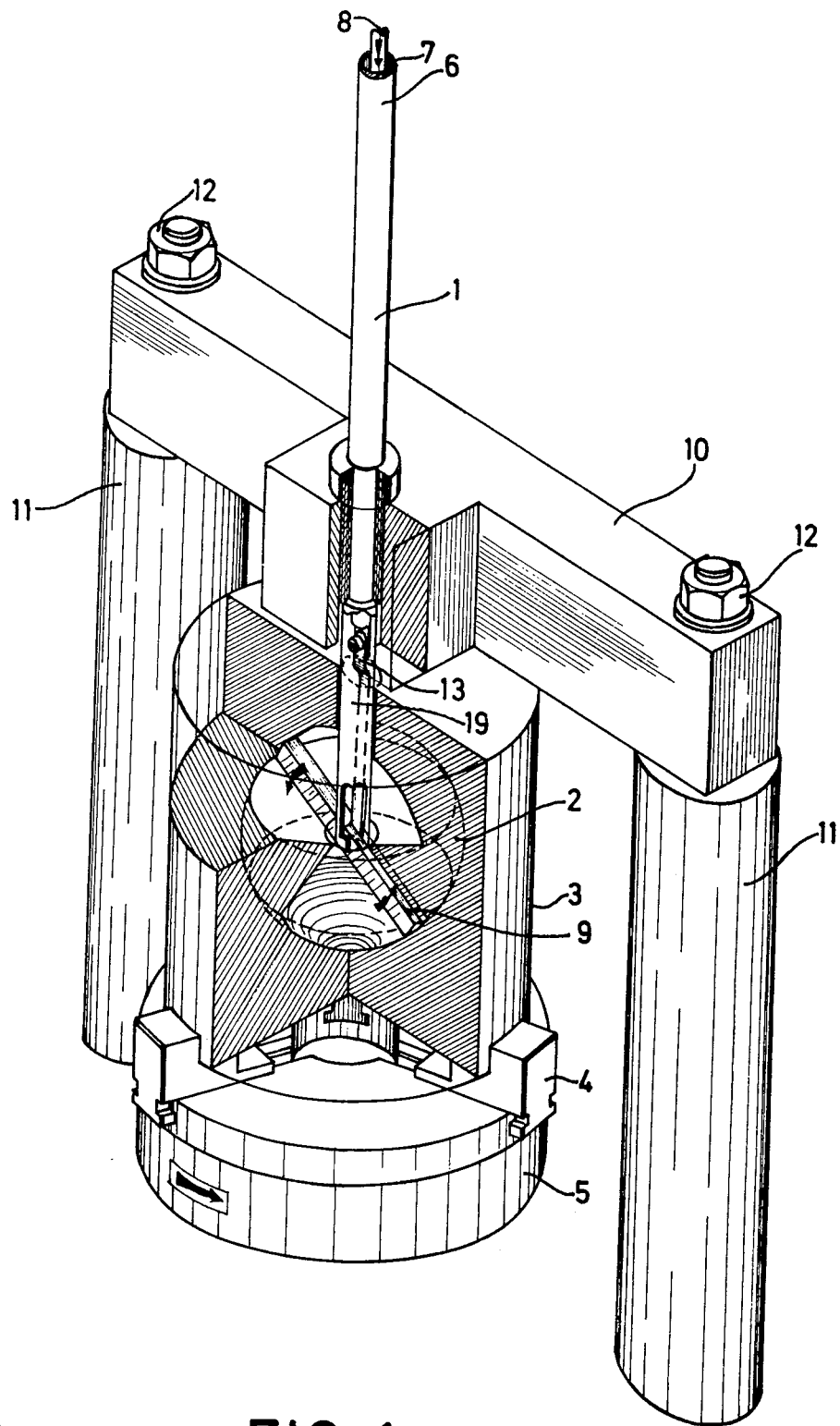
Figure 2:
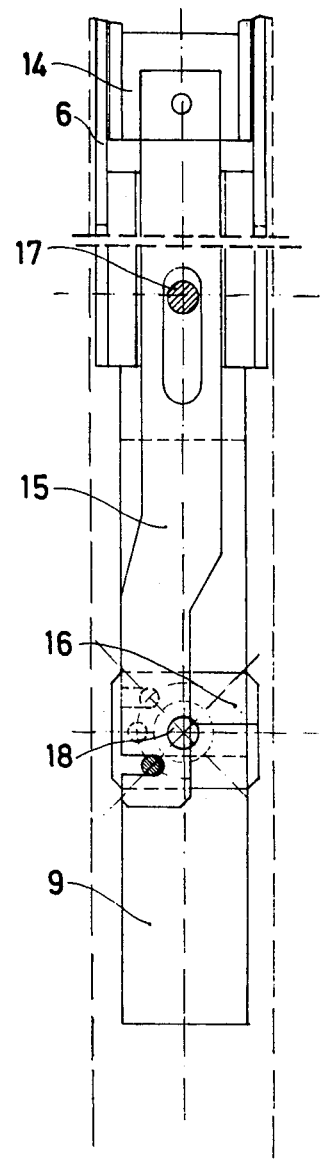
Figure 10:
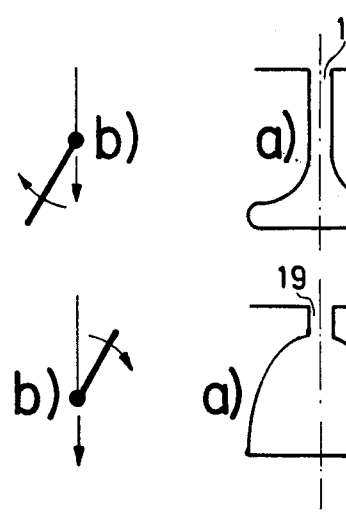
Figure 11:
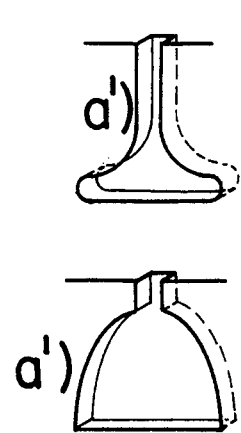
Figure 3:
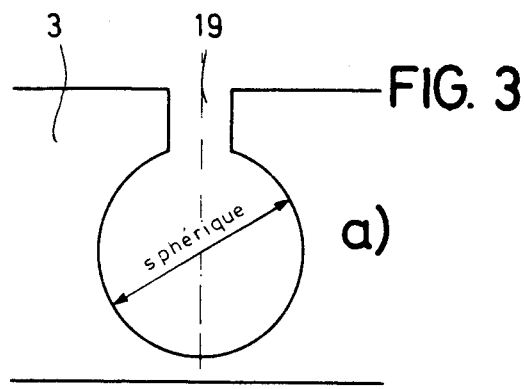
Figure 3:
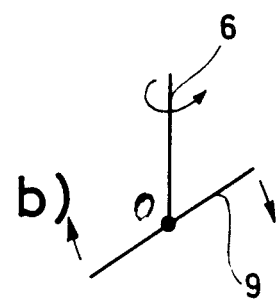
Figure 4:
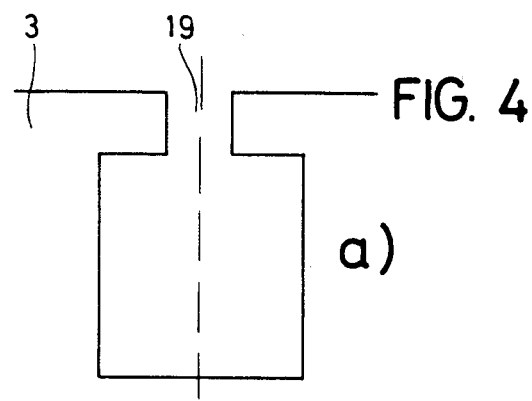
FIG. 4 shows the production of a cylinder. For example, starting from the preceding sphere, the movable electrode is placed perpendicular to the vertical axis and the electrode is moved longitudinally whereas the component or workpiece rotates around the vertical axis.
Figure 4:
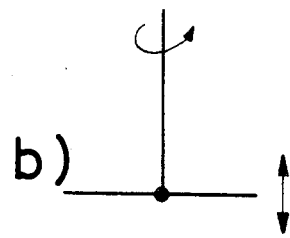

Finally, FIGS. 10 and 11 illustrate the production of two cavities which differ from the conventional shape and show that the electrode assembly according to the invention may be used to produce many different shapes or cavities.

FIGS. 10a and 11a show how the rotation and lowering of the movable part along with the rotation of the workpiece may be used to produce a differently shaped cavity. FIGS. 10a' and 11a' show a cavity wherein the workpiece was not rotated but the movable part was rotated and lowered as in 10a and 11a.

When the volume of metal to be removed is considerable most of it can be removed rapidly, giving a rough surface, which can subsequently be finished slowly. Of course, the volume of metal removed depends on a number of factors such as the nature of the metal and of the electrode, the dimensions of the system and the electric parameters, and can be of the order of a cubic centimeter per minute. The operating voltage may be between 100 and 120 V and the current between 10 and 20 amps, depending on the electrode and the material being machined.

In order to produce a cavity having a given shape, the motion of the electrode and workpiece is controlled by profiled cams. Alternatively, motion may be controlled by a computer, more particularly in the case of very complex cavities. The electrode assembly described herein is not limited to the described applications, but other embodiments could be envisaged without departing from the invention.

What we claim is:

1. An apparatus for creating cavities by electroerosion within a solid component, comprising a hollow stationary cylinder; a single electrically conductive driving control rod surrounded by and coaxial with said cylinder; a driving square terminating one end of said rod; and an electrode connected to said driving square, said electrode by the driving control rod being pivotable around an axis perpendicular to the axis of the cylinder, movable together with the rod along the axis of the cylinder, positionable perpendicular to the axis of said cylinder and rotatable around said axis of said cylinder.

2. An apparatus as claimed in claim 1, wherein the electrode is connected at one end to the driving square.

3. An apparatus as claimed in claim 1, wherein the electrode is connected at its centre to the driving square.

4. An apparatus as claimed in claim 1 wherein means are provided for supplying a dielectric liquid for removing the waste produced during erosion to the space between the cylinder and the control rod in the direction towards the interior of the solid component.

5. An apparatus as claimed in claim 1 wherein the control rod is controlled at its top end by a cam profile.

6. A method of electroerosion within a solid, electrically conducting component, comprising machining a pilot channel in the component so as to provide a channel having a cross-section identical with the aperture cross-section of the proposed cavity; introducing an electrode into the channel, moving said electrode relative to said solid, said electrode being movable in a controlled manner about an axis perpendicular to said channel, longitudinally of the channel, perpendicular to said channel and rotatable about the axis of said channel and having a diameter smaller than the channel cross-section and removing material from the cavity so formed in the solid component.

7. A component having a cavity produced by a method as claimed in claim 6.

* * * * *